United States Patent
Carnevali

(10) Patent No.: US 9,255,591 B2
(45) Date of Patent: Feb. 9, 2016

(54) APPARATUS ADAPTER

(71) Applicant: Jeffrey D. Carnevali, Seattle, WA (US)

(72) Inventor: Jeffrey D. Carnevali, Seattle, WA (US)

(*) Notice: Subject to any disclaimer, the term of this patent is extended or adjusted under 35 U.S.C. 154(b) by 165 days.

(21) Appl. No.: 14/058,260

(22) Filed: Oct. 20, 2013

(65) Prior Publication Data
US 2015/0110545 A1    Apr. 23, 2015

(51) Int. Cl.
| F16D 3/00 | (2006.01) |
| F16B 1/00 | (2006.01) |
| F16D 3/50 | (2006.01) |
| F16D 1/116 | (2006.01) |
| F16D 1/10 | (2006.01) |
| F16B 7/04 | (2006.01) |

(52) U.S. Cl.
CPC . *F16B 1/00* (2013.01); *F16D 1/116* (2013.01); *F16D 3/50* (2013.01); *F16B 7/042* (2013.01); *F16D 2001/103* (2013.01); *Y10T 403/32975* (2015.01); *Y10T 403/60* (2015.01)

(58) Field of Classification Search
CPC ............ Y10T 403/5793; Y10T 403/58; Y10T 403/581; Y10T 403/583; Y10T 403/585; Y10T 403/587; Y10T 403/59; Y10T 403/591; Y10T 403/592; Y10T 403/60; Y10T 403/602; Y10T 403/604; Y10T 403/32957; F16B 1/00; F16B 7/042; F16L 37/0841; F16D 1/116; F16D 2001/103; F16D 3/50
USPC ............. 403/315–32, 322.1–322.4, 323–327, 403/330, 345, 359.4, 315–321, 164
See application file for complete search history.

(56) References Cited

U.S. PATENT DOCUMENTS

| 2,221,371 | A | * | 11/1940 | De Bethune | 403/328 |
| 3,554,585 | A | * | 1/1971 | Sorenson | 403/105 |
| 3,753,361 | A | * | 8/1973 | Schiesterl | 70/185 |
| 3,796,502 | A | * | 3/1974 | Federspiel | 403/106 |
| 4,541,457 | A | * | 9/1985 | Blenkush | 137/614.06 |
| 4,760,984 | A | * | 8/1988 | Hennessey | 248/121 |
| 4,896,986 | A | * | 1/1990 | Terayama | 403/14 |
| 5,586,472 | A | * | 12/1996 | Lin | 74/594.1 |
| 5,593,196 | A | * | 1/1997 | Baum et al. | 294/174 |
| 5,845,943 | A | * | 12/1998 | Ramacier et al. | 285/12 |
| 6,523,441 | B2 | * | 2/2003 | Lee | 81/177.85 |
| 6,585,444 | B1 | * | 7/2003 | Podbutzky | 403/322.1 |
| 6,626,465 | B2 | * | 9/2003 | Lacroix et al. | 285/80 |
| 7,316,425 | B2 | * | 1/2008 | Poder | 285/93 |
| 7,695,024 | B2 | * | 4/2010 | Ostergren et al. | 285/308 |
| 8,087,451 | B2 | * | 1/2012 | Gammons | 165/46 |
| 8,671,799 | B2 | * | 3/2014 | Chen | 74/594.4 |

* cited by examiner

*Primary Examiner* — Gregory Binda
*Assistant Examiner* — Nahid Amiri
(74) *Attorney, Agent, or Firm* — Charles J. Rupnick

(57) ABSTRACT

An apparatus adapter, including a first adapter member having an internal cavity with an opening thereinto, and a slot spaced away from the opening and oriented transverse of the internal cavity and communicating therewith. A second adapted member has an adaptation extension that is sized to be received into the internal cavity of the first adapter member, the adaptation extension having an interlock relief formed in an outer surface thereof and juxtapositionable with the transverse slot. A plunger has an elongated open band that is positionable about the first adapter member and movable transversely of the internal cavity, an interlock member that is projected into an interior of the band and sized to slidably extend through the slot of the receiver post and enter into the internal cavity, and a biasing member for biasing the interlock member into the internal cavity for occluding a portion thereof.

18 Claims, 6 Drawing Sheets

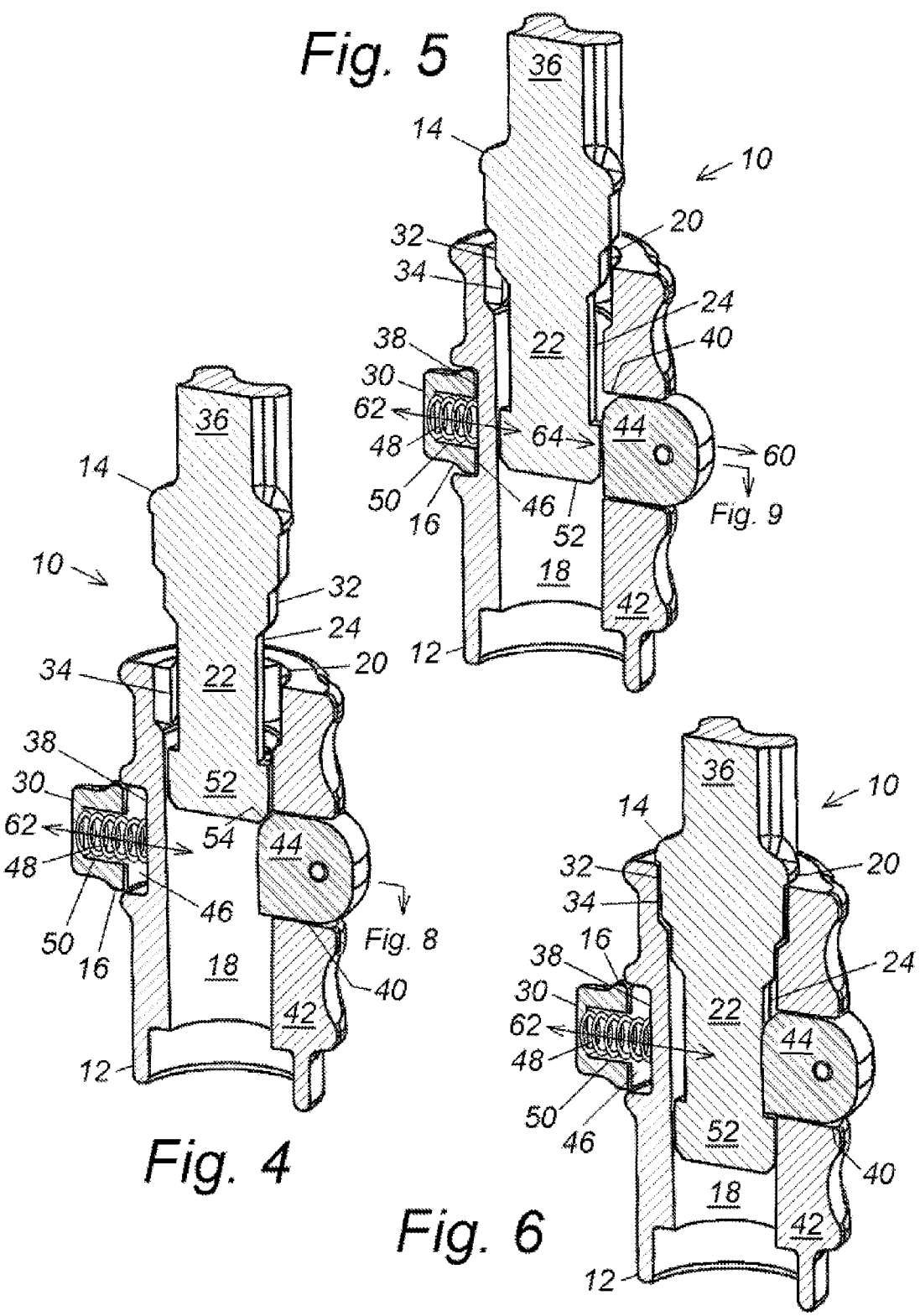

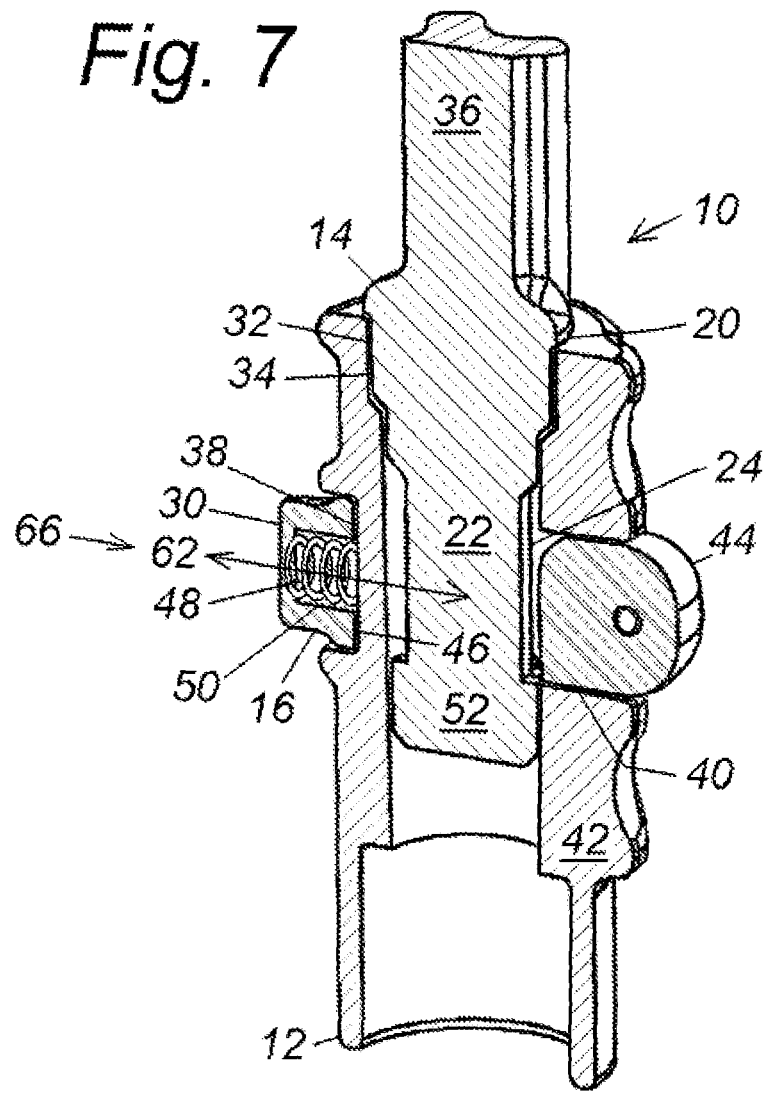

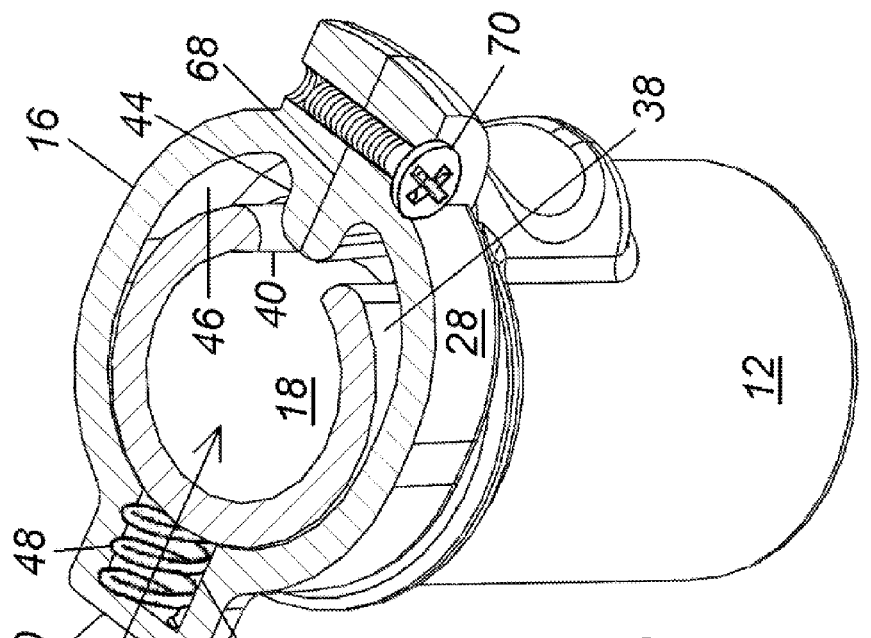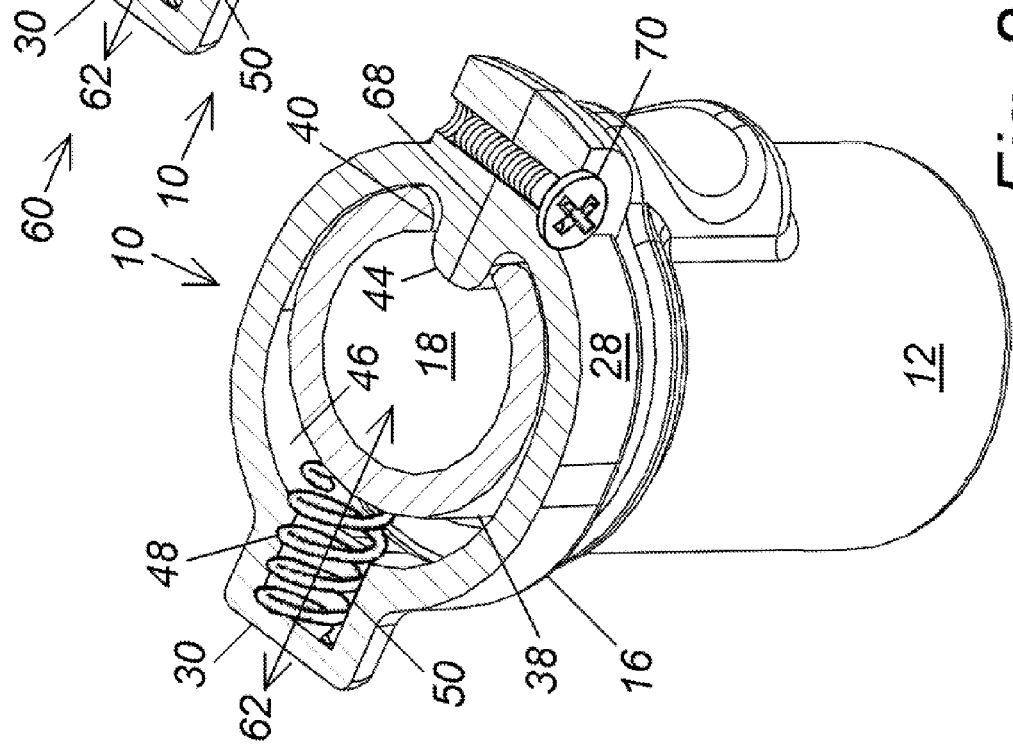

APPARATUS ADAPTER

FIELD OF THE INVENTION

The present invention relates to an apparatus adapter for joining two different rigid members, and in particular to an apparatus adapter having a spring plunger for releasably interlocking with and, thereby, retaining a second adapted member relative to a first adapter member.

BACKGROUND OF THE INVENTION

Apparatus adapters are generally well known for joining two different rigid members into one, including apparatus adapters having means for interlocking the two rigid members together.

However, known apparatus adapters are limited in their ability to provide releasable interlocking capability efficiently and reliably.

SUMMARY OF THE INVENTION

The present invention is an apparatus adapter with a spring plunger.

According to one aspect of the invention, the apparatus adapter includes a first adapter member having an internal cavity with an opening thereinto, and a slot spaced away from the opening and oriented transverse of the internal cavity and communicating therewith. A second adapted member has an adaptation extension that is sized to be received into the internal cavity of the first adapter member, the adaptation extension having an interlock relief formed in an outer surface thereof and juxtapositionable with the transverse slot. A plunger has an elongated open band that is positionable about the first adapter member and movable transversely of the internal cavity, an interlock member that is projected into an interior of the band and sized to slidably extend through the slot of the receiver post and enter into the internal cavity, and a biasing member that is positioned for biasing the interlock member into the internal cavity for occluding a portion thereof.

According to another aspect of the invention, the first adapter member further includes a positioning contour external of the internal cavity; and the elongated open band of the plunger is further sized to be received into the external positioning contour in a position surrounding the first adapter member. For example, the first adapter member further includes an annular relief groove formed on an external surface thereof transversely of the internal cavity and aligned with the slot; and the elongated open band of the plunger is further sized to be slidingly received into the annular relief groove of the first adapter member.

According to another aspect of the invention, anti-rotation means is provided between the second adapted member and the first adapter member. For example, the anti-rotation means is formed of a mating male spline and female spline.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 is a cross-section through the apparatus adapter of FIG. 1 during assembly thereof, wherein the mating adapted member is received into the adapter member prior to actuation of the cooperating plunger member;

FIG. 5 is another cross-section through the apparatus adapter of FIG. 1 during assembly thereof, wherein the mating adapted member is received into the adapter member during operation of the cooperating plunger member;

FIG. 6 is another cross-section through the apparatus adapter of FIG. 1 at completion of assembly thereof, wherein the mating adapted member is fully received into the adapter member, and an expansive biasing member biases an interlock member of the cooperating plunger member into an internal cavity of the adapter member for occluding a portion thereof, thereby interlocking with and retaining the adapted member relative to the adapter member;

FIG. 7 is another cross-section through the apparatus adapter of FIG. 1 that illustrates release of the adapted member from interlock with the adapter member by application of a compression force against a release operator of the plunger member;

FIG. 8 and FIG. 9 are cross-section views through the apparatus adapter of FIG. 1 as illustrated in FIG. 4 and FIG. 5, respectively, taken through the plunger member transversely of the adapter member, wherein the mating adapted member is omitted for clarity, wherein FIG. 8 illustrates the normal state of the apparatus adapter, and FIG. 9 illustrates the active state of the apparatus adapter.

DETAILED DESCRIPTION OF PREFERRED EMBODIMENT

As required, a detailed illustrative embodiment of the present apparatus adapter is disclosed herein. However, techniques, systems and operating structures in accordance with the present protective enclosure may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present protective enclosure. The following presents a detailed description of an illustrative embodiment (as well as some alternative embodiments) of the present protective enclosure.

In the Figures, like numerals indicate like elements.

Figure 1:
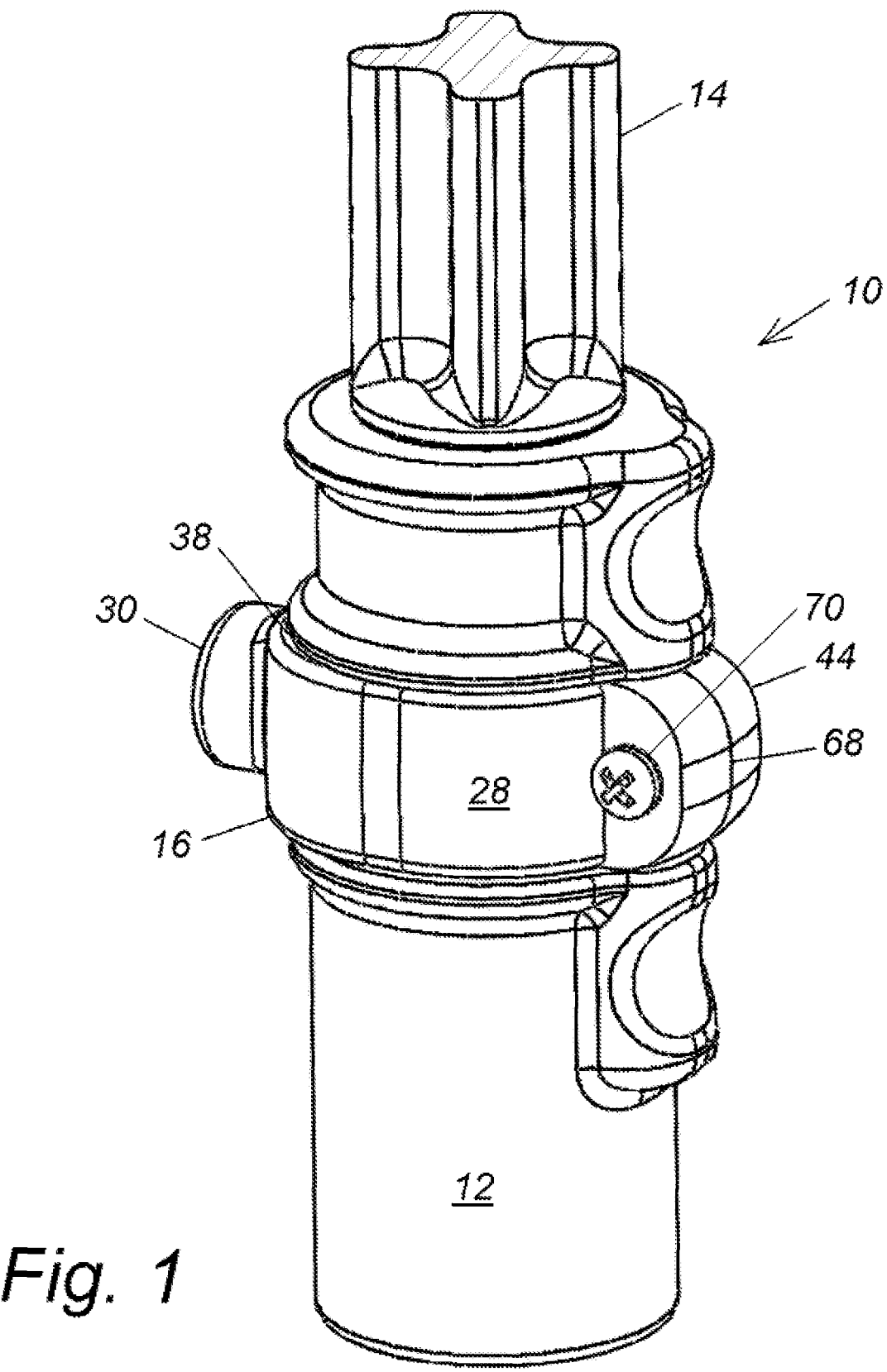
FIG. 1 is a perspective view showing an example of the apparatus adapter of the invention for interconnecting two different rigid adapter and adapted members.

FIG. 1 illustrates an apparatus adapter 10 for a interconnecting two different rigid members 12 and 14. One structure 12 is a first adapter member structured to receive different second adapted member 14. A rigid plunger member 16 is coupled to cooperate with adapter member 12 for interlocking with and, thereby, retaining adapted member 14 relative to adapter member 12.

As illustrated here, first adapter member 12 is illustrated being a rigid post adapter, and second adapted member 14 is illustrated as being a mating rigid post. However, it will be understood that such illustrations are for exemplary purposes of this disclosure and are not intended to limit the scope of the invention in any way. Rather, first adapter member 12 and second adapted member 14 are optionally any two rigid structures wherein first adapter member 12 operates for adapting second adapted member 14 to attach to a third member having receiver structure that is not normally compatible with second adapted member 14.

Figures 2, 3:
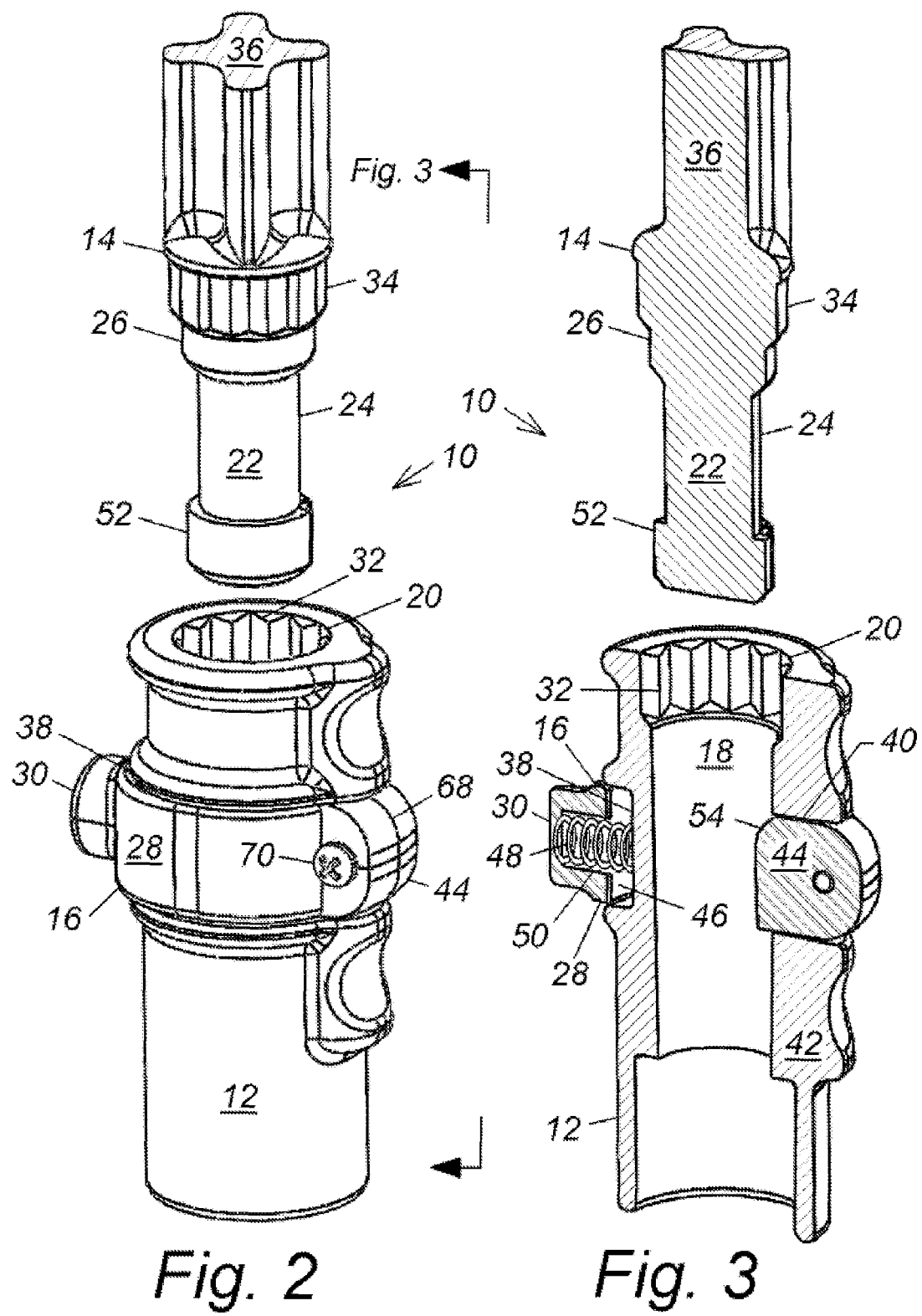
FIG. 2 illustrates the apparatus adapter of FIG. 1, wherein a second adapted member is being inserted into a first adapter member with a cooperating plunger member.
FIG. 3 is a cross-section through the apparatus adapter of FIG. 2 illustrating the adapter member, the adapted member and the cooperating plunger member.

FIG. 2 illustrates second adapted member 14 being inserted into first adapter member 12. Adapter member 12 is formed with an internal cavity 18 having an opening 20 thereinto, and mating adapted member 14 is formed with an adaptation extension 22 that is sized to be received through opening 20 into internal cavity 18 of adapter member 12. Adaptation extension 22 includes an interlock relief 24 formed in an outer surface 26 thereof. Plunger member 16 includes an elongated open band 28 that is positionable about adapter member 12 and a release operator 30 that is operable for releasing plunger member 16 from an interlock state for retaining adapted member 14 relative to adapter member 12.

Optionally, as illustrated here, internal cavity 18 of adapter member 12 is substantially cylindrical in form, having a long axis passing through a center of opening 20 thereinto. Adaptation extension 22 of mating adapted member 14 is formed with a substantially cylindrical columnar shape that is sized to be a slip-fit with cylindrical internal cavity 18. Accordingly, cylindrical adaptation extension 22 is rotatable within cylindrical internal cavity 18, whereby a rotational orientation may be selected between adapted member 14 and adapter member 12.

An anti-rotation means is optionally provided between adapter member 12 and adapted member 14 for fixing a selected rotational orientation therebetween. By example and without limitation, internal cavity 18 of adapter member 12 is formed with a female spline 32 adjacent to opening 20, and mating adapted member 14 is formed with a mating male spline 34 adjacent to hilt of adaptation extension 22, between adaptation extension 22 and a main body 36 thereof. Alternatively, adapter member 12 and mating adapted member 14 are formed with mutually mating key and keyways. Accordingly, alternative anti-rotation means between adapter member 12 and mating adapted member 14 are also contemplated and may be substituted for mating female and male splines 32, 34 without deviating from the scope and intent of the present invention.

FIG. 3 is a cross-section through adapter member 12 and adapted member 14 and cooperating plunger member 16 of apparatus adapter 10 as illustrated in FIG. 2. Here, adapter member 12 is shown having an annular groove 38 formed about exterior of internal cavity 18. A slot 40 is formed through an annular wall 42 of adapter member 12 in a position spaced away from opening 20 and is oriented transverse of internal cavity 18 and communicating therewith. Here, cooperating plunger member 16 is shown as being seated in annular groove 38 formed about adapter member 12 exterior of internal cavity 18. Plunger member 16 is sized to be slidable in annular groove 38 of adapter member 12 and movable transversely of internal cavity 18 thereof. Plunger member 16 includes a rigid interlock member 44 that is projected into an interior 46 of elongated open band 28 when plunger member 16 is positioned about adapter member 12 in annular groove 38. Interlock member 44 is sized to slidably extend through slot 40 of receiver member 12 and enter into its internal cavity 18. An expansive biasing member 48, such as a conventional compression spring, is positioned for urging interlock member 44 into internal cavity 18 of adapter member 12 for occluding a portion thereof. By example and without limitation, expansive biasing member 48 is compressed between release operator 30 of plunger member 16 and annular groove 38 formed about adapter member 12. For example, biasing member 48 fits in a relief 50 formed in plunger biasing member 48. Thus positioned, biasing member 48 expands between release operator 30 of plunger member 16 and annular groove 38 of adapter member 12 for expansively biasing interlock member 44 for slidably extending through slot 40 of receiver member 12 and entering into the internal cavity 18 for occluding a portion thereof.

FIG. 4 is a cross-section through apparatus adapter 10 during assembly thereof, wherein mating adapted member 14 is received into adapter member 12, prior to actuation of cooperating plunger member 16. Here, in a normal state of apparatus adapter 10, biasing member 48 is expanded in relief 50 between plunger release operator 30 of member 16 and annular groove 38 of adapter member 12 for biasing interlock member 44 to slidably extend through slot 40 into internal cavity 18, whereby interlock member 44 occludes a portion of internal cavity 18.

During assembly of apparatus adapter 10, an end 52 of adaptation extension 22 distal from main body 36 of mating adapted member 14 is received through opening 20 into internal cavity 18 of adapter member 12. Adaptation extension 22 is inserted until distal end 52 thereof passes female spline 32 and contacts plunger interlock member 44 occluding a portion of internal cavity 18. According to one embodiment, a bevel on distal end 52 of adaptation extension 22 encounters a lead-in formed on a receiver surface 54 of plunger interlock member 44.

FIG. 5 is another cross-section through apparatus adapter 10 during assembly thereof, wherein mating adapted member 14 is received into adapter member 12, during operation of cooperating plunger member 16. Here, adaptation extension 22 is inserted until distal end 52 thereof passes slot 40 in annular wall 42 of adapter member 12 and plunger interlock member 44. Thereafter, adaptation extension 22 forces plunger interlock member 44 outwardly (arrow 60) of internal cavity 18 into wall slot 40 against expansive biasing force (arrow 62) of biasing member 48. Apparatus adapter 10 is thereby transformed into an active state, wherein biasing member 48 is compressed into relief 50 between plunger release operator 30 of plunger member 16 and annular groove 38 of adapter member 12 by application of an outwardly directed compression force (arrow 64) applied to plunger interlock member 44 in the plane of plunger band 28 oriented normal to internal cavity 18 of adapter member 12.

Simultaneously, band 28 of plunger member 16 is translated slidingly along annular groove 38 transversely of internal cavity 18. Accordingly, relief 50 containing biasing member 48 is reduced, thereby compressing biasing member 48 between release operator 30 of plunger member 16 and annular groove 38 formed about adapter member 12. Expansive biasing force (arrow 62) is thus increased in biasing member 48.

During continued insertion of adaptation extension 22 of mating adapted member 14 into internal cavity 18 of adapter member 12, male spline 34 of adapted member 14 adjacent to base of adaptation extension 22 encounters and engages with female spline 32 adjacent to receiver opening 20. Engagement of mating female and male splines 32, 34 or other anti-rotation means fixes rotational orientation between adapter member 12 and adapted member 14.

FIG. 6 is another cross-section through apparatus adapter 10 at completion of assembly thereof, wherein mating adapted member 14 is fully received into adapter member 12, and expansive biasing member 48 biases interlock member 44 of cooperating plunger member 16 into internal cavity for occluding a portion thereof, thereby interlocking with and thus retaining adapted member 14 relative to adapter member 12.

Here, adaptation extension 22 is inserted until distal end 52 thereof completely passes slot 40 in annular wall 42 of adapter member 12 and interlock member 44 of cooperating plunger member 16. Thereafter, biasing member 48 again expands in relief 50 between plunger release operator 30 of member 16 and annular groove 38 of adapter member 12. Accordingly, interlock member 44 is biased to slidably extend through slot 40 into position for occluding a portion of internal cavity 18 between distal end 52 of adaptation extension 22 of mating adapted member 14 and opening 20 into internal cavity 18 of adapter member 12. For example, interlock member 44 is biased by biasing member 48 into entering into interlock relief 24 in outer surface 26 of adaptation extension 22 between main body 36 and distal end 52 thereof. Plunger member 16 thereby cooperates with adapter member 12 for interlocking with and, thereby, retaining adapted member 14 relative thereto by occluding a portion of internal cavity 18.

When interlock relief 24 formed in an outer surface 26 of adaptation extension 22 is an annular groove formed between main body 36 and distal end 52 thereof and substantially encircling an outer circumference thereof, as shown, mating female and male splines 32, 34 provide anti-rotation means between adapter member 12 and mating adapted member 14. Alternatively, when interlock relief 24 is formed as a key and mating keyway positioned between outer surface 26 of adaptation extension 22 and internal cavity 18 of adapter member 12, additional splines 32, 34 or other anti-rotation means between opening 20 of adapter member 12 and hilt of adaptation extension 22 are not necessary to rotationally fix mating adapted member 14 relative to adapter member 12.

FIG. 7 illustrates release of adapted member 14 from interlock with adapter member 12 by application of a compression force (arrow 66) against release operator 30 of plunger member 16 in the plane of plunger band 28, which overcomes expansive biasing force (arrow 62) of biasing member 48 and forces plunger interlock member 44 outwardly (arrow 60) of internal cavity 18 into wall slot 40. Interlock of adapted member 14 is thus relieved, and adaptation extension 22 can be withdrawn from internal cavity 18 of adapter member 12.

FIG. 8 and FIG. 9 are cross-section views of FIG. 4 and FIG. 5, respectively, taken through plunger member 16 transversely of adapter member 12, wherein mating adapted member 14 is omitted for clarity. FIG. 8 illustrates the normal state of apparatus adapter 10, wherein biasing member 48 is expanded in relief 50 between plunger release operator 30 of member 16 and annular groove 38 of adapter member 12 for biasing interlock member 44 to slidably extend through slot 40 into internal cavity 18, whereby interlock member 44 occludes a portion of internal cavity 18. FIG. 9 illustrates the active state of apparatus adapter 10, wherein plunger interlock member 44 is forced outwardly (arrow 60) of internal cavity 18 into wall slot 40 against expansive biasing force (arrow 62) of biasing member 48. Biasing member 48 is thus compressed into relief 50 between plunger release operator 30 of plunger member 16 and annular groove 38 of adapter member 12 by in-plane translation of plunger band 28 slidingly along annular groove 38 transversely of internal cavity 18. Accordingly, relief 50 containing biasing member 48 is reduced, thereby compressing biasing member 48 between release operator 30 of plunger member 16 and annular groove 38 formed about adapter member 12. Expansive biasing force (arrow 62) is thus increased in biasing member 48.

Figure 10:
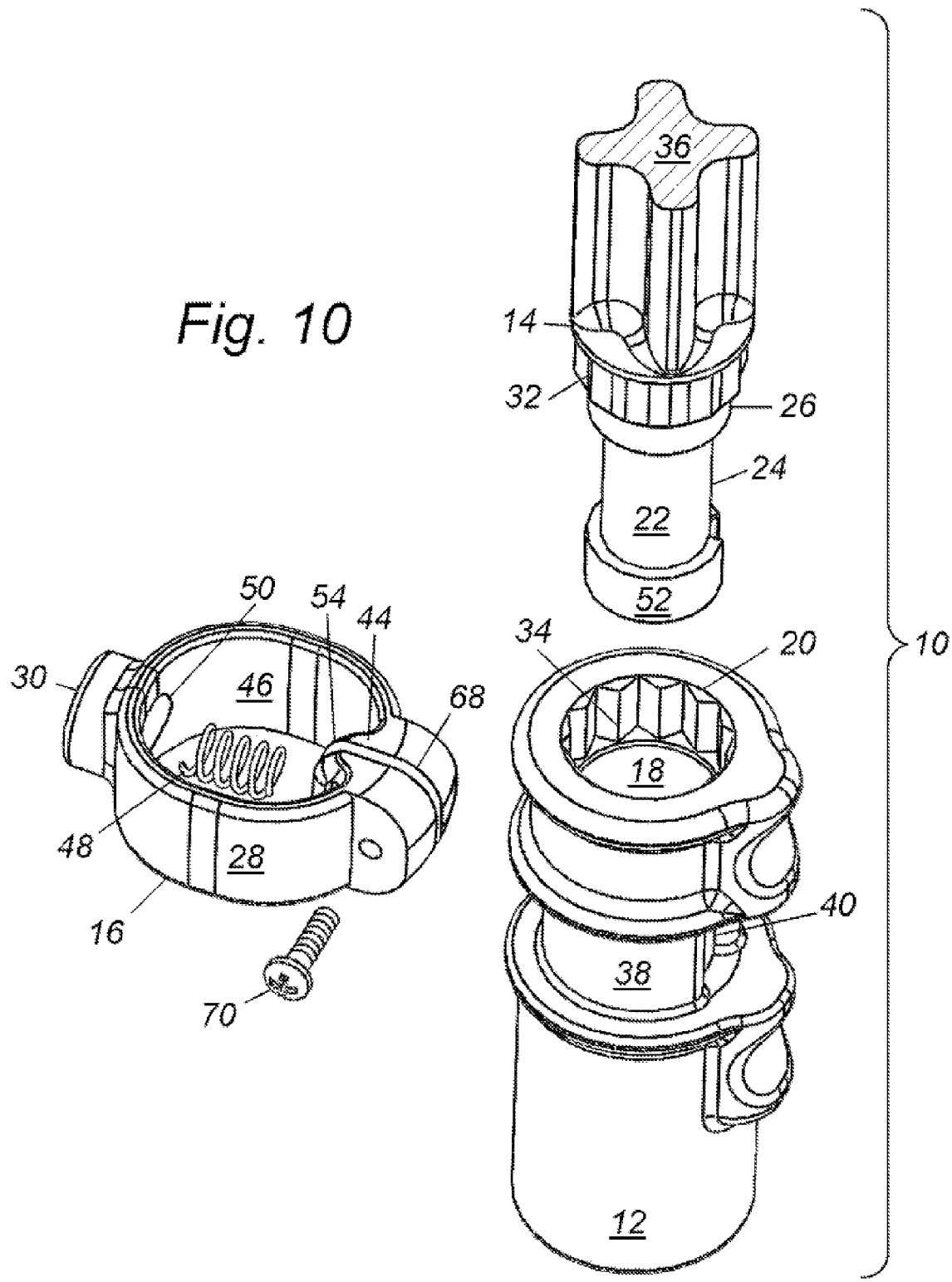
FIG. 10 is an exploded view of the apparatus adapter of FIG. 1 that illustrates the elongated open band of the plunger member having a passage or split for fitting over an annular groove formed in the exterior of the adapter member.

FIG. 10 is an exploded view of apparatus adapter 10. As illustrated, elongated open band 28 of plunger member 16 includes a passage or split 68, for example through interlock member 44. Accordingly, elongated open band 28 can be opened to fit around adapter member 12. Plunger member 16 can thus be seated in annular groove 38 of adapter member 12 exterior of internal cavity 18. During installation of plunger member 16 in annular groove 38 of adapter member 12, expansive biasing member 48 is positioned in relief 50 between release operator 30 of plunger member 16 and annular groove 38 about adapter member 12. After plunger member 16 is seated in annular groove 38 of adapter member 12, split 68 is optionally closed and fastened, for example using a fastener 70 between split portions of interlock member 44.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. An apparatus adapter, comprising:
   a first adapter member comprising an internal cavity having an opening thereinto, and a slot spaced away from the opening and oriented transverse of the internal cavity and communicating therewith;
   a second adapted member comprising an adaptation extension that is sized to be received into the internal cavity of the first adapter member in a plurality of different discrete interlockable rotational orientations, the adaptation extension comprising an interlock relief formed in an outer surface thereof and juxtapositionable with the transverse slot; and
   a plunger comprising an elongated open band that is positionable about the first adapter member and movable transversely of the internal cavity, an interlock member projected into an interior of the band and sized to slidably extend through the slot of the first adapter member and enter into the internal cavity thereof, and a biasing member positioned for biasing the interlock member into the internal cavity for occluding a portion thereof.

2. The apparatus adapter of claim 1, wherein the biasing member further comprises an expansive biasing member.

3. The apparatus adapter of claim 1, wherein the plurality of different discrete interlockable rotational orientations of the second adapted member further comprises at least two or more different selected rotational orientations of the second adapted member relative to the first adapter member.

4. The apparatus adapter of claim 1, further comprising a mating male spline and female spline between the first adapter member and the second adapted member.

5. The apparatus adapter of claim 1, wherein the first adapter member further comprises a positioning contour external of the internal cavity; and
   wherein the elongated open band of the plunger is further sized to be received into the external positioning contour in a position surrounding the first adapter member.

6. The apparatus adapter of claim 1, wherein the first adapter member further comprises an annular relief groove formed on an external surface thereof transversely of the internal cavity and aligned with the slot; and wherein the elongated open band of the plunger is further sized to be slidingly received into the annular relief groove of the first adapter member.

7. The apparatus adapter of claim 6, wherein the elongated open band of the plunger further comprises a split; and
further comprising a fastening means for fastening the elongated open band of the plunger across the split thereof.

8. The apparatus adapter of claim 1, wherein the biasing member further comprises a compression spring.

9. The apparatus adapter of claim 1, wherein the first adapter member further comprises a rigid post adapter; and
wherein the second adapted member further comprises a rigid post.

10. An apparatus adapter, comprising:
a first adapter member comprising a tubular internal cavity having an opening thereinto adjacent to one end thereof, a positioning contour external of the tubular cavity and comprising an annular relief groove, and a transverse slot through a wall of the tubular internal cavity and spaced away from the opening thereinto and communicating therewith;
a second adapted member comprising an adaptation extension that is sized to be received into the tubular internal cavity through the opening thereinto, and the adaptation extension comprising an annular positioning relief groove encircling an outer circumference thereof;
a plunger comprising an elongated oblong band that is sized to be received into the positioning contour in a position surrounding the first adapter member external of the tubular internal cavity and is further slidably movable in the annular relief groove of the first adapter member, the plunger band being movable therein transversely of the internal cavity of the first adapter member, and an interlock member projected into an interior of the band and sized to movably extend through the transverse slot and enter into the tubular cavity in a position occluding a portion thereof, the plunger having a first position with the interlock member retracted within the slot and clear of the internal cavity, and second position with the interlock member extended into and partially occluding the internal cavity, and
an expansive biasing member positioned between the interior of the band of the plunger opposite from the interlock member thereof and an exterior surface of the first adapter member.

11. The apparatus adapter of claim 10, wherein the expansive biasing member further comprises a conventional compression spring.

12. The apparatus adapter of claim 10, wherein the adaptation extension of the second adapted member is rotatable within the tubular internal cavity of the first adapter member.

13. The apparatus adapter of claim 10, further comprising a male spline and a mating female spline operable between the second adapted member and the first adapter member.

14. The apparatus adapter of claim 13, wherein the second adapted member further comprises the male spline and the first adapter member further comprises the mating female spline.

15. The apparatus adapter of claim 10, wherein the first adapter member further comprises a rigid post adapter; and
wherein the second adapted member further comprises a rigid post.

16. An apparatus adapter, comprising:
a rigid first adapter member comprising a substantially cylindrical internal cavity having an opening thereinto adjacent to one end thereof, an annular relief groove external of the tubular cavity, and a transverse slot through a tubular wall of the internal cavity and spaced away from the opening thereinto and communicating therewith;
a rigid second adapted member comprising a substantially cylindrical adaptation extension that is sized to be slidingly received into the substantially cylindrical internal cavity through the opening thereinto, and the adaptation extension comprising an annular positioning relief groove encircling an outer circumference thereof;
a male spline and a mating female spline operable between the first adapter member and the second adapted member and fixing a selected rotational orientation therebetween;
a rigid plunger comprising an open oblong band that is sized to be received into the annular relief groove in a position surrounding the first adapter member externally of the internal cavity, the plunger band being movable therein transversely of the internal cavity of the first adapter member, and an interlock member projected into an interior of the band and sized to movably extend through the transverse slot and enter into the tubular cavity in a position occluding a portion thereof, the plunger having a first position with the interlock member retracted within the slot and clear of the internal cavity, and second position with the interlock member extended into and partially occluding the internal cavity; and
an expansive biasing member positioned between the interior of the band of the plunger opposite from the interlock member thereof and an exterior surface of the first adapter member.

17. The apparatus adapter of claim 16, wherein the second adapted member further comprises the male spline formed adjacent to one end of the adaptation extension, and the first adapter member further comprises the mating female spline formed in the internal cavity thereof.

18. The apparatus adapter of claim 16, wherein the oblong band of the plunger is further slidably movable in the annular relief groove of the first adapter member, and is further slidably movable in the annular relief groove of the first adapter member.

* * * * *